(12) United States Patent
Vans et al.

(10) Patent No.: US 8,867,796 B2
(45) Date of Patent: *Oct. 21, 2014

(54) AUTOMATED INSPECTION OF A PRINTED IMAGE

(75) Inventors: Marie Vans, Ft. Collins, CO (US); Gidi Amir, Ness Ziona (IL); Rodolfo Jodra, Boise, ID (US); Omer Barkol, Haifa (IL); Ram Dagan, Modiin (IL); Avi Malki, Pethch Tikya (IL); Carl Staelin, Haifa (IL); Sagi Schein, Haifa (IL); Mani Fischer, Haifa (IL); Doron Shaked, Tivon (IL); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 207 days.

This patent is subject to a terminal disclaimer.

(21) Appl. No.: 13/259,390

(22) PCT Filed: Jan. 21, 2010

(86) PCT No.: PCT/US2010/021606
§ 371 (c)(1),
(2), (4) Date: Nov. 30, 2011

(87) PCT Pub. No.: WO2011/090475
PCT Pub. Date: Jul. 28, 2011

(65) Prior Publication Data
US 2012/0070040 A1    Mar. 22, 2012

(51) Int. Cl.
*G06K 9/00* (2006.01)
*H04N 1/00* (2006.01)
*G06T 7/00* (2006.01)
*B41F 33/00* (2006.01)
*H04N 1/40* (2006.01)

(52) U.S. Cl.
CPC ............. *G06T 7/001* (2013.01); *H04N 1/0005* (2013.01); *H04N 1/00029* (2013.01); *H04N 1/00015* (2013.01); *H04N 1/00047* (2013.01); *B41F 33/0036* (2013.01); *H04N 1/40068* (2013.01); *G06T 2207/10024* (2013.01); *G06T 2207/30144* (2013.01)
USPC .............................. 382/112; 358/1.3; 358/1.9

(58) Field of Classification Search
CPC ...................... G06T 2207/30144; G06T 7/003
USPC ................................... 382/112; 358/1.13, 1.9
See application file for complete search history.

(56) References Cited

U.S. PATENT DOCUMENTS 5,237,655 A * 8/1993 Statt et al. ..................... 345/504
5,490,237 A * 2/1996 Zimmerman et al. ........ 358/1.16

(Continued)

FOREIGN PATENT DOCUMENTS

JP    2005-43235    2/2005
JP    2005-207952   8/2005

(Continued)

OTHER PUBLICATIONS

Zhou Wang; Bovik, A.C.; Sheikh, H.R.; Simoncelli, E.P., "Image quality assessment: from error visibility to structural similarity," Image Processing, IEEE Transactions on, vol. 13, No. 4, pp. 600,612, Apr. 2004.*

(Continued)

*Primary Examiner* — Stephen R Koziol
*Assistant Examiner* — Shaghayegh Azima (57) ABSTRACT

Automated inspection method for detecting a defect in a printed image, comprising processing a raster image, sending the raster image to a print process, printing a printed image corresponding to the raster image onto a medium, capturing a target image from at least a part of the printed image at a lower resolution than the printed image, at least in a medium moving direction, converting at least a part of the raster image to a reference image, and comparing the reference image to the target image.

19 Claims, 6 Drawing Sheets

(56) References Cited

U.S. PATENT DOCUMENTS

| | | | |
|---|---|---|---|
| 5,559,896 A * | 9/1996 | Okuda et al. | 382/141 |
| 5,654,804 A * | 8/1997 | Hattori | 358/404 |
| 5,737,453 A * | 4/1998 | Ostromoukhov | 382/275 |
| 5,987,159 A | 11/1999 | Nichani | |
| 5,999,636 A * | 12/1999 | Juang | 382/112 |
| 6,094,276 A * | 7/2000 | Yamaguchi et al. | 358/1.15 |
| 6,246,788 B1 | 6/2001 | Pattikonda et al. | |
| 6,335,978 B1 * | 1/2002 | Moscato et al. | 382/112 |
| 6,362,870 B2 * | 3/2002 | Mui et al. | 355/24 |
| 6,469,805 B1 * | 10/2002 | Behlok | 358/1.9 |
| 6,522,430 B1 * | 2/2003 | Dalal et al. | 358/406 |
| 6,738,150 B1 * | 5/2004 | Claiborne et al. | 358/1.11 |
| 6,804,417 B1 * | 10/2004 | Lund et al. | 382/299 |
| 6,912,071 B1 * | 6/2005 | Rasmussen et al. | 358/406 |
| 7,810,896 B2 * | 10/2010 | Mizes et al. | 347/19 |
| 8,326,079 B2 * | 12/2012 | Vans et al. | 382/275 |
| 2003/0039402 A1 * | 2/2003 | Robins et al. | 282/275 |
| 2004/0057629 A1 * | 3/2004 | Shikami et al. | 382/254 |
| 2004/0146202 A1 * | 7/2004 | Hyoki | 382/209 |
| 2006/0067571 A1 * | 3/2006 | Onishi | 382/149 |
| 2006/0115127 A1 * | 6/2006 | Hatayama | 382/112 |
| 2006/0271237 A1 | 11/2006 | Kim | |
| 2007/0058222 A1 * | 3/2007 | Dalal et al. | 358/518 |
| 2007/0247665 A1 * | 10/2007 | Rosenfeld et al. | 358/1.18 |
| 2007/0247673 A1 * | 10/2007 | Rosenfeld et al. | 358/474 |
| 2007/0291287 A1 * | 12/2007 | Snyder et al. | 358/1.9 |
| 2008/0158274 A1 * | 7/2008 | Tasaka | 347/8 |
| 2008/0273794 A1 * | 11/2008 | Samworth | 382/167 |
| 2010/0020244 A1 * | 1/2010 | Mitsuya et al. | 348/699 |
| 2010/0119170 A1 * | 5/2010 | Sengamedu et al. | 382/251 |
| 2010/0303281 A1 * | 12/2010 | Wu et al. | 382/100 |
| 2011/0038009 A1 * | 2/2011 | Cooper et al. | 358/3.06 |
| 2011/0052010 A1 * | 3/2011 | Xu et al. | 382/112 |
| 2011/0069894 A1 * | 3/2011 | Vans et al. | 382/218 |
| 2011/0133887 A1 * | 6/2011 | Tian et al. | 340/5.86 |
| 2011/0158522 A1 * | 6/2011 | Tsujii | 382/166 |
| 2011/0182496 A1 * | 7/2011 | Sakai et al. | 382/145 |

FOREIGN PATENT DOCUMENTS

| | | |
|---|---|---|
| JP | 3810746 | 8/2006 |
| JP | 2008-22082 | 1/2008 |

OTHER PUBLICATIONS

State Intellectual Property Office of the People'S Republic of China, "Office Action," issued in connection with Application No. 201080062035.8, Mar. 27, 2014, 9 pages.

* cited by examiner

AUTOMATED INSPECTION OF A PRINTED IMAGE

BACKGROUND OF THE INVENTION

Defects in printed images can be caused by a number of factors including anomalies in print medium, interactions between print medium and marking material, systematic defects introduced by print mechanisms or human error. Image defects may include but not be limited to scratches, spots, missing dot clusters, streaks, and banding.

Print defects are undesirable and efforts have been made in the art to develop suitable methods for their detection. Such techniques can broadly be categorised as manual (human) inspection or automated inspection. Human techniques are generally more time consuming than automated methods and studies have shown that even where the inspection process is structured and repeatable, manual inspection is only approximately 80% accurate [1]. Moreover, the time consuming nature of manual inspection is prohibitive in commercial printing applications where typically a printing press may operate at speeds in excess of two meters per second, necessitating fast inspection of printed images. Clearly, such inspection rates are beyond human capability.

Generally, automated inspection systems fall into one of three categories depending on the defect detection approach: (i) image reference (or template matching) approaches, (ii) design rule approaches, or (iii) some combination of both (hybrid approaches) [2-5]. In the simplest image reference approach, a reference exists that allows a direct comparison between a potentially defective image and a corresponding reference image. It is typical in this case to inspect 100% of the potentially defective image. A more elaborate referential approach involves recognizing features of potentially defective items in images and comparing those features with a set of idealized or perfect features. Inspection coverage on potentially defective items can vary in this case and may not necessarily be 100%. In the design-rule approach, a set of rules that describe properties of images are defined and can be statistically verified for a potentially defective image. In this case, as little as 10% of a product need be inspected before generating the appropriate statistics and determining whether a defect exists.

Automated inspection methods require substantial computational resources, and this requirement is exacerbated where variable data prints must be inspected for image defects. In variable data printing each image can be different and, if a referential approach is adopted, each image must be inspected in relation to a different reference image. For example, a customer job may require personalization of each print with a different name, address, or other information. In some applications it may be necessary to conduct inspection of all printed images (e.g. in the pharmaceutical industry 100% inspection is required for medicine labels). Such automated inspection methods cause either significant delay, or increase in costs.

In order to meet the demand for automated defect detection of variable data products, time and/or cost efficient image detection methods and apparatus are desirable.

BRIEF DESCRIPTION OF THE DRAWINGS

For the purpose of illustration, certain embodiments of the present invention will now be described with reference to the accompanying diagrammatic drawings, in which.

DETAILED DESCRIPTION

In the following detailed description, reference is made to the accompanying drawings. The embodiments in the description and drawings should be considered illustrative and are not to be considered as limiting to the specific embodiment of element described. Multiple embodiments may be derived from the following description and/or drawings through modification, combination or variation of certain elements. Furthermore, it may be understood that also embodiments or elements that are not literally disclosed may be derived from the description and drawings by a person skilled in the art.

Figure 1:
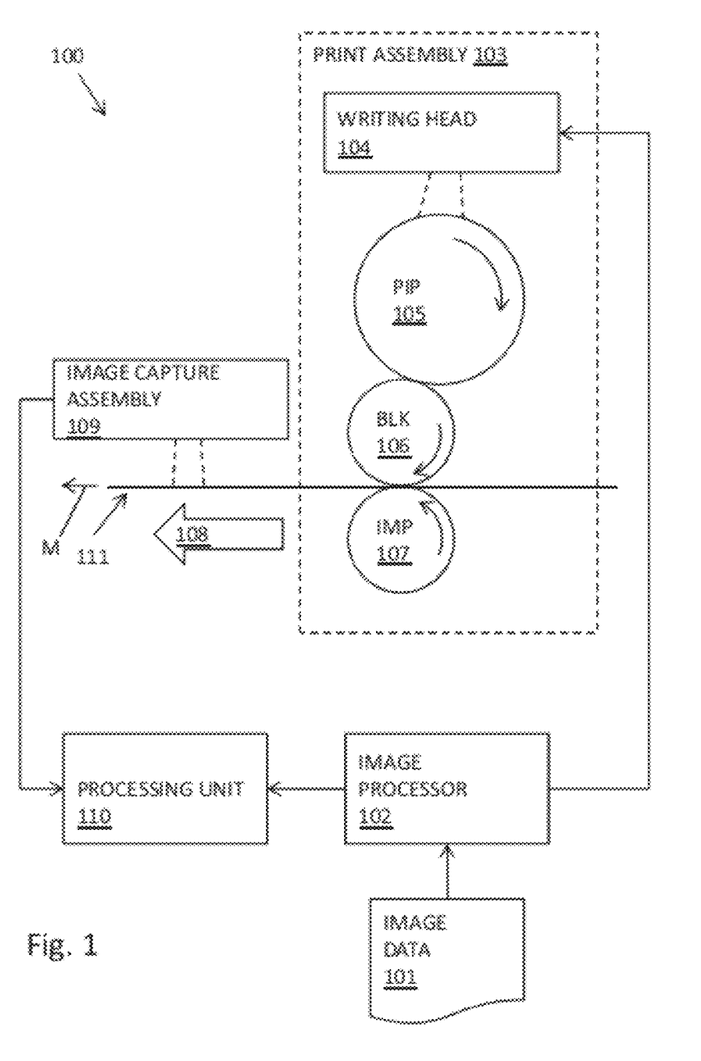
FIG. 1 shows a diagram representing a photo-electrographic print system suitable for detecting errors in a printed image.

FIG. 1 shows a print system 100 for printing an image from image data 101 and detecting image defects in the resulting printed image. The system 100 may comprise a print assembly 103 which in turn may comprise a writing head 104, a photo imaging plate (PIP) 105, a blanket drum (BLK) 106 and an impression drum (IMP) 107. The illustrated print assembly 103 may correspond to that of an offset lithographic printer and/or liquid electro-photographic (LEP) printer such as the HP Indigo Digital Press®. However, it will be appreciated that print assembly 103 is provided for illustrative purposes only, and that any suitable mechanism for printing an image from image data may be used without departing from the scope of the present invention, such as laser printers, inkjet printers, dye-sublimation printers etc. The writing head may comprise a laser device or other light source suitable for writing an image on an electro-photographic surface. Also included in the system 100 may be an image capture arrangement 109, a processor unit 110 and/or an image processor 102.

In the present embodiment, the image capture arrangement 109 may be a device capable of converting an image on a print medium or product to a digital image. The image capture assembly 109 may be an in-line image capture assembly 109 and/or an in-line scanning system. It may be arranged within the printer so as to capture an image of medium 111 moving with respect to the in-line image capture assembly 109. The image capture assembly 109 may be arranged to capture an image of the printed medium at a lower resolution than the print resolution. The image capture assembly 109 may be arranged to capture a part of the printed image and/or the entire printed image. The image capture assembly 109 may comprise one or multiple image capture sensors such as photosensors, LEDs, laser diodes, scanners, etc. For example, multiple scanners may be arranged next to each other, each scanner having a width that may be less than the maximum medium width, wherein the scanning areas of the scanners may overlap. The image capture assembly 109 may be arranged to capture image on one or two sides of the medium 11, e.g. for two sided printing. For example, scanners may be arranged on opposite sides so that a medium 11 passes between the two opposite scanners and is scanned on both printed sides. Each sensor may be arranged to capture a part of the image printed onto the medium 111, and/or the entire width of the medium 111. The sensor may comprise a one color channel, i.e. monochrome, or a multiple color channels sensor, for example, to capture a gray level and/or RGB target image, respectively.

Image data 101 may be received by the image processor 102 which converts input image data 101 into a raster image suitable for the print assembly 103 using established techniques. The input image data 101 may also comprise a pre-generated raster image. The image processor 102 may comprise a RIP (Raster Image Processing) system for creating a raster image. The print assembly 103 may be equipped with a halftoning function, for halftoning and printing a received raster image. The image processor 102 may convert the raster image into a reference image. The reference image may be made suitable to be compared to the one or multiple target images, for example so as to have an approximately matching resolution.

The raster image may be sent to the print assembly 103. The print assembly 103 may be arranged to convert the raster image into halftone data for the writing head 104. The writing head 104 may produce the image on the PIP 105. In turn, the PIP may transfer the image to the BLK 106 which may then transfer the image onto a print medium 111 such as sheet paper on the IMP 107. Before or once the printed image exits the print assembly 103 in direction M, the image capture assembly 109 may capture the printed image on medium 111, either incrementally or as a whole, and may send the corresponding image data as a 'target image' to the processing unit 110.

The image processor 102 may generate said reference image associated with the raster image and send the reference image to the processing unit 110. The reference image may have a significantly lower resolution than the raster image. The processing unit 110 may compare the reference image to the target image for assessing the similarity between them and determine if one or more defects are present in the target image according to the method discussed below. Detected defects in the target image may indicate that defects may be present in the printed image.

The processing unit 110 may comprise one or more GPUs (graphical processing units). The processing unit 110 may comprise a combination of CPUs (Central Processing Units) and GPUs, or optionally one or more CPUs. In an embodiment, the processing unit 110 may be arranged to alter the color spectrum of the reference image so as to match the color spectrum of the target image. In an embodiment, the processing unit 110 may be arranged to alter the resolution of one or both of the target image and the reference image. The processing unit 110 may be arranged to compare a target image with the reference image. The processing unit 110 may be arranged to compare at least a part of the target image with a corresponding part of the reference image. Multiple comparison operations may be executed in parallel by multiple GPUs.

Figure 2:
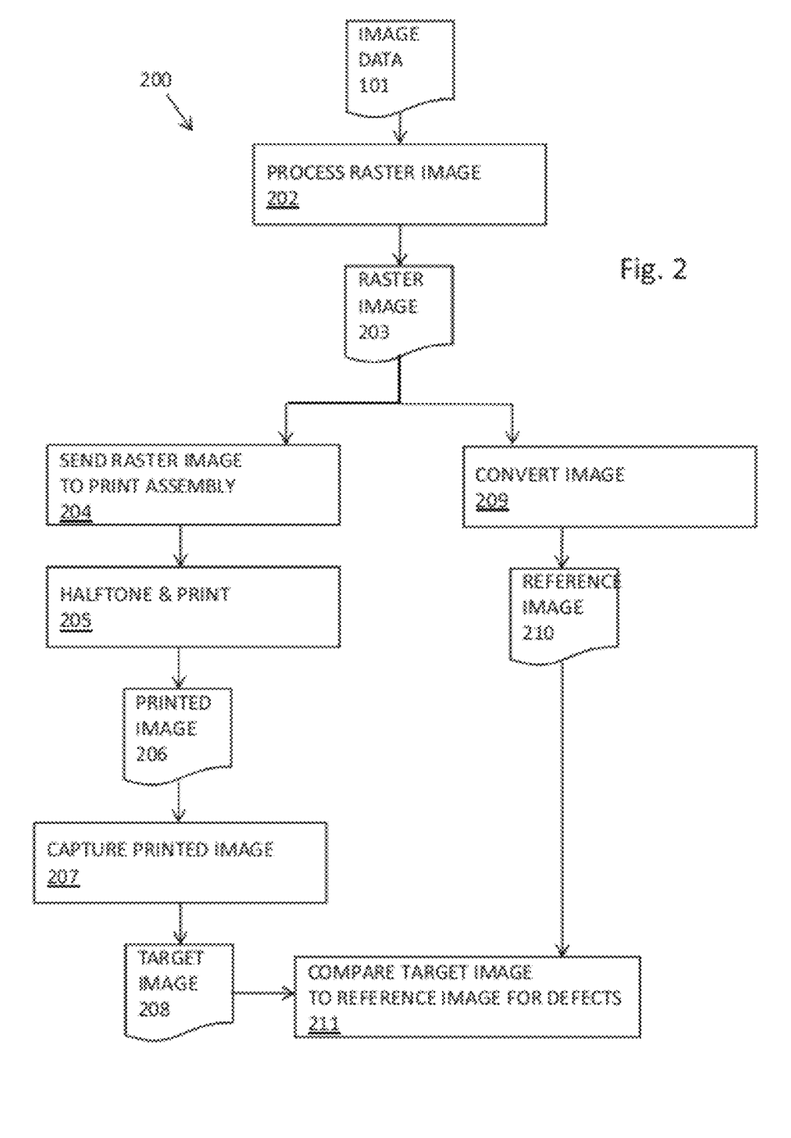
FIG. 2 shows a flow chart representing an automated inspection method for detecting a defect in a printed image.

FIG. 2 illustrates an automated inspection method 200 for detecting a defect in a printed image 206. Image data 101 may be received as input by the print system 100. The image data 101 may comprise a scanned analogue image, and/or digital image data received via a computer, network and/or digital data carrier.

The image data 101 may be processed by the image processor 102. The image processor 102 may generate a raster image 203, or the image data 101 may comprise a pre-generated raster image 203. The image processor 102 may send the raster image 203 to the print assembly 103 in step 204 for subsequent halftoning and electrophotographic printing. The raster image 203 may be in a resolution and format that is appropriate for the print assembly 103 concerned. The raster image 203 may be in a print resolution. For example, for a LEP system, such as the HP Indigo Digital Press®, the raster image 203 may be generated at a resolution of approximately 812 DPI (Dots Per Inch), for example in a CMYK (cyan, magenta, yellow, black) color space, for a corresponding print resolution of 812 DPI. Here, the print resolution may be indicated by pixels resolution in dots per inch (DPI). The image processor 102 may comprise information describing the required intensity and/or density level of each pixel in each of the color planes in the raster image 203.

During the print process, the raster image 203 may be halftoned into different color patterns in step 205, within the print assembly 103. A printed image 206 may be printed onto a medium 111. The print process may comprise an electrographic print process as described above. The medium 111 may for example comprise paper, or any other substrate. The printed resolution may be understood as the printed dots (pixels) resolution, which may correspond to the raster image resolution. For example, the printed resolution may be 600 DPI or more, for example 812 DPI, for example corresponding to the resolution of the raster image. The printed image 206 may be captured in step 207 by the image capture assembly 109. The image capture assembly 109 may capture the printed image 206 as a target image 208, wherein the target image 208 may have a lower resolution than the printed image 206. The resolution of the target image 208 may be dependent on the components of the image capture assembly 109. The resolution of the target image 208 may for example be approximately 300 DPI or less, or approximately 135 DPI or less, or approximately 67 DPI or less in a moving direction M of the medium 111. In a width direction, i.e. perpendicular to the moving direction M, the resolution of the target image 208 may for example be approximately 600 DPI or less, or for example between approximately 300 and 600 DPI. For example, the resolution of the target image 208 may be approximately 200 DPI in a width direction and 80 DPI in a moving direction. In an embodiment, the target image 208 may be generated in above mentioned resolutions in a first stage. Also the resolution of the reference image 210 may be lowered in a first stage, for example to exactly or nearly match the resolution of the target image 208. These first stage operations may be executed by the image processor 102. In a second stage the resolution of the target image 208 or the reference image 210 may be further adjusted so as to more precisely match the resolution of the reference image 210 or the target image 208, respectively. These second stage operations may be executed by the processing unit 110.

The image processor 102 may generate a reference image 210 in step 209. The image processor 102 may convert the raster image 203 into the reference image 210. The reference image 210 may be generated from the raster image 203. In another optional embodiment, the reference image 210 may be generated directly from the input image data.

The reference image 210 may be in a format that is better suitable for the comparison operation of step 211, to be compared to the target image. The target image 208 may be constrained by the image capture assembly 109 used and/or the processing power available to the processing unit 110. In the conversion of step 209, the resolution of the reference image 210 may be chosen to match, or to be close to, the target image 208 resolution produced by the image capture assembly 109. The resolution of the reference image 210 may be dependent of and/or close to the output image resolution of the image capture assembly 109. For example, the image capture assembly 109 may be arranged to output images of predetermined resolution and of at least one predetermined color channel. In an embodiment, the resolution of the image capture assembly 109 may be approximately 300 DPI or less, for example approximately 135 DPI or less, for example approximately 67 DPI or less, at least in a moving direction M of the medium 111. Correspondingly, the resolution of the target image 208 may be approximately 300 DPI or less, for example approximately 135 DPI or less, for example approximately 67 DPI or less in said direction M. For example, the image capture assembly 109 may be configured to operate at approximately 67 DPI in a RGB (red, green, blue) or approximately 135 DPI in a grey scale color space. In this instance the resolution of the reference image 210 may be generated accordingly In alternative embodiments 210 the target image 208 may be processed to match the resolution of the reference image 210. In other embodiments, both the reference image 210 and the target image 208 may be processed to conform to a mutual resolution. In again a further embodiment, the conversion step 209 that comprises conversion of the raster image 203 to the reference image 210 may comprise a downscaling of the raster image 203 to a resolution that is lower than the resolution of the raster image 203 and/or the printed image 206. Downscaling the resolution of the reference image 210 to be lower than the printed image 206, i.e. closer to the resolution of the target image 208, may facilitate a more efficient comparison operation 211 between the reference image 210 and the target image 208. Smaller sized images may be processed faster and may generally improve the performance of the system 1. It may be advantageous to prevent large size image being sent through and within the system 1.

At this stage, the processing unit 110 may have received two processed images in substantially the same resolution, i.e. the reference image 210 corresponding to the raster image 203, and the target image 208. It will be understood by those skilled in the art that in an embodiment the downscaling of the original image to produce the reference image 210 may be performed by the processing unit 110, rather than the image processor 102, wherein the raster image 203 may be send to the processing unit 110 for conversion into the reference image 210. However, having approximately matching target and reference image resolutions, 210 may allow specialized processing units 110 such as GPUs perform specialized comparison operation, as indicated by step 211. Since GPUs are relatively cheaper as central processing units (CPUs), multiple GPUs may be used for this operation 211, instead of using faster and more expensive CPUs.

In a second stage, after said downscaling, the processing unit 110 may convert the color format of the reference image 210 so as to correspond to the color spectrum format of the target image 208. For example the color spectrum of the reference image 210 may be converted from CMYK to RGB or gray scale.

In the second stage, the processing unit 110 may adjust the resolution of the target image 208 so as to match the resolution of the reference image 210. For example, the initial resolution of the target image 208, i.e. the captured image, may be approximately 200×80 DPI, whereas the resolution of the reference image 210 may be approximately 203.2×81.28 DPI. The resolution of the target image 208 may be adjusted so as to match the resolution of the reference image 210. In another embodiment, the resolution of the reference image 210 may be adjusted so as to match the resolution of the target image 208.

Figure 3:
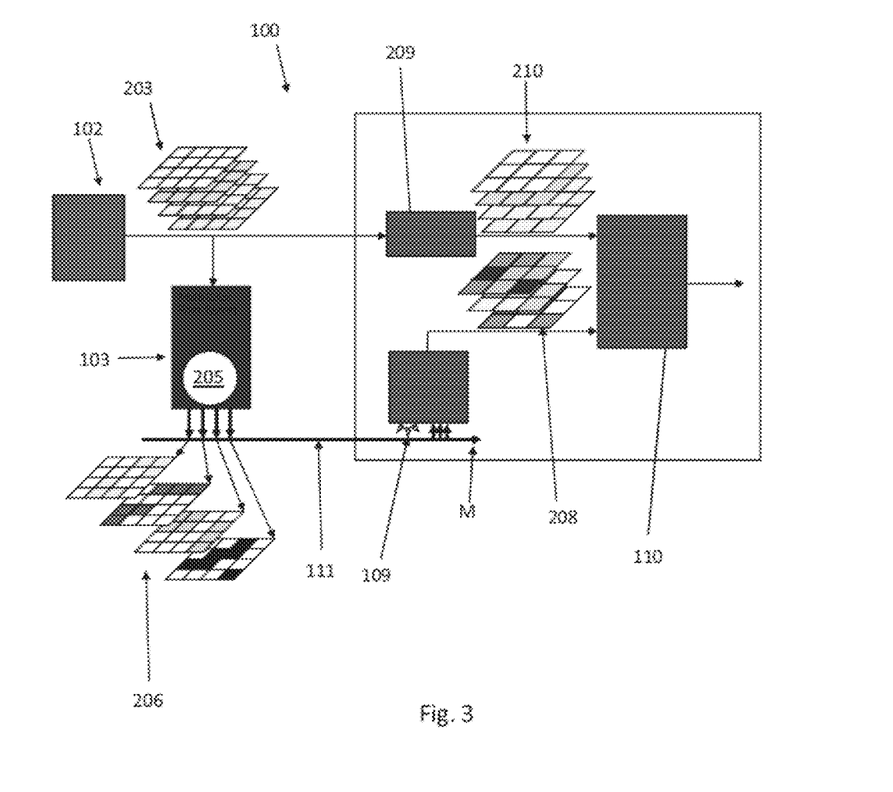
FIG. 3 shows a diagrammatic overview of a print system and automated inspection method.

FIG. 3 shows a diagrammatic overview of a print system 100 and automated inspection method wherein the target image 208 and the reference image 210 may comprise low resolution images. The image processor 102 may generate a raster image 203. The raster image 103 may comprise a relatively high resolution CMYK image, e.g. 812×812 DPI. The raster image 103 may be sent to the print assembly 103 which is equipped with a halftoning function 205. The halftone patterns corresponding to each C, M, Y and/or K ink may be generated and printed on the medium 111. The resulting printed image 206 may be captured by one or multiple RGB sensors of the image capture assembly 109 at a relatively low resolution, for example of 300 DPI or less, or 150 DPI or less, such as 135 or 67 DPI in a moving direction M of the medium 111. Alternatively, the image capture assembly 109 may capture the printed image 206 in a CMYK color spectrum, for example at a relatively high resolution such as approximately the print resolution, and then converted to lower resolution RGB color spectrum target image 208.

The image processor 102 may convert the raster image 203 to a reference image 210 having approximately the same resolution as the target image 208, although the resolution may still be slightly different. The processing unit 110 may convert the color spectrum of the reference image 210 so as to match the target image 208, in this instance RGB. The processing unit 110 may adjust the resolution of the target image 208 so as to match the resolution of the reference image 210. The reference image 210 and the target image 208 may be compared by the processing unit 110. Multiple target images 208 may be compared with respective regions of the reference image 210 by multiple GPUs. Through the use of the multiple GPU's and the matching resolutions of the target and reference images 208, 210, the inspection method may be executed in real-time while moving the medium 111 through the printer 100 for outputting the printed image 206.

Figure 4:
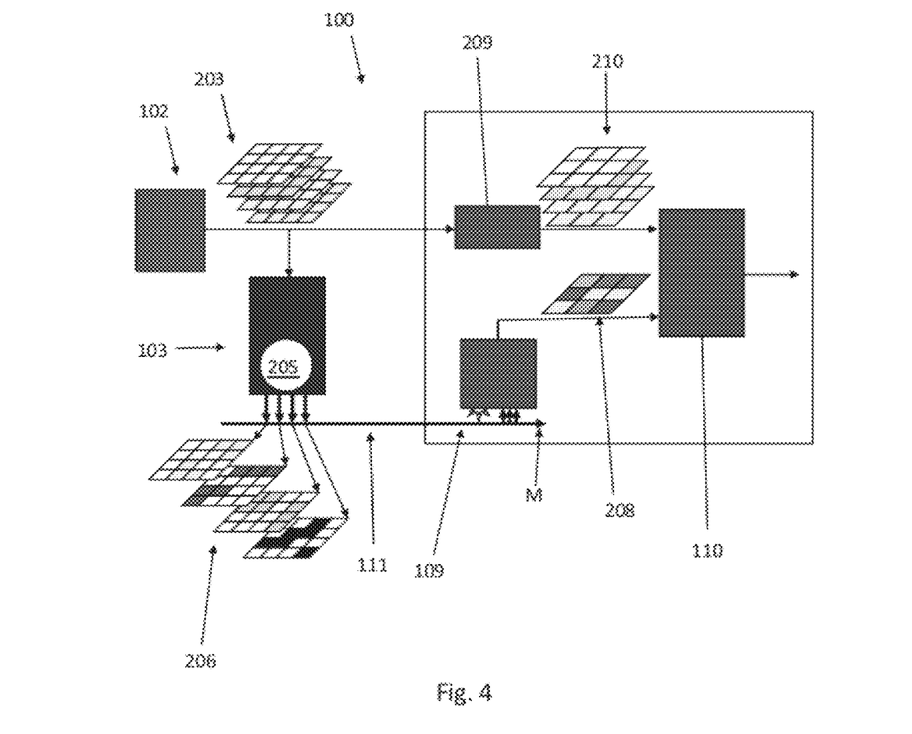
FIG. 4 shows a diagrammatic overview of another print system and automated inspection method.

Another embodiment of a print system 100 and an inspection method may be illustrated in the diagrammatic drawing of FIG. 4. Here, the target image 208 may have a monochromatic spectrum. The image capture assembly 109 may capture the printed image 206 at one color channel only. This may allow for a relatively cheap and efficient image capture and comparison operation. The image capture assembly 109 may comprise monochromatic photosensors. In an alternative embodiment, the captured image may have multiple color channels, and the target image 208 may be converted to a gray scale image after image capture, for example by the processing unit 110. In a first stage, the reference image 210 may comprise multiple color channels, e.g. CMYK, and in a second stage, at least a part of the multiple color channel reference image 210 may be converted into a single color channel, i.e. gray scale, reference image 210. This may allow for a relatively efficient comparison with the corresponding gray scale channel target image 208. Other components of the print system 100 may be similar to the system 100 shown in FIG. 3. This system 100 may allow for a fast and cost efficient inspection system 100 and method.

Figure 5:
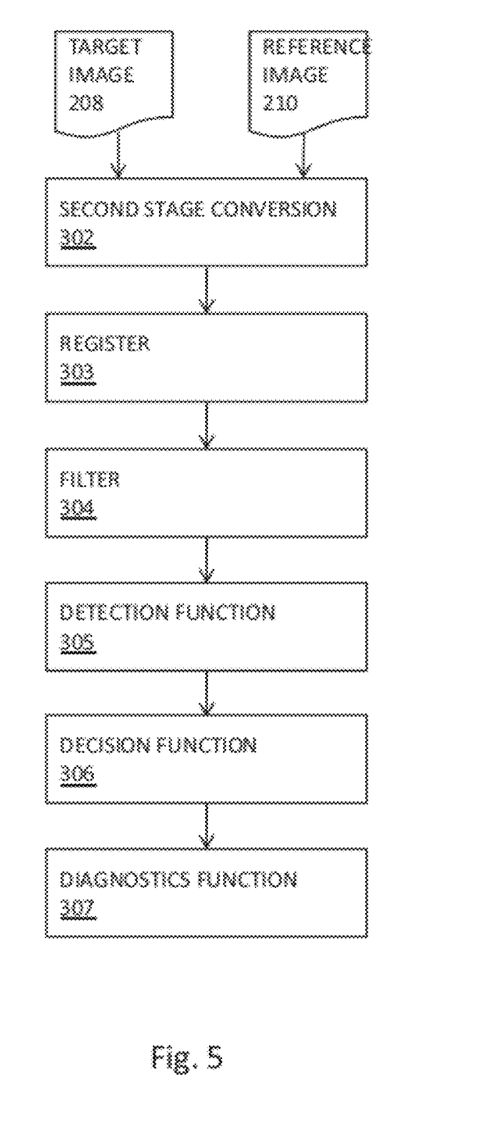
FIG. 5 shows a flow chart of a comparison operation for defect detection performed by the processing unit.

FIG. 5 shows an embodiment of a comparison operation which may be performed by the processor unit 110 for detecting a defect in a printed image in accordance with an embodiment of the invention. In the second stage conversion step 302, the reference image 210 and target image 208 may be converted to have substantially the same color format at substantially the same resolution, as explained above. Then, the reference image 210 and target image 208 may be registered in step 303 to align the image to enable accurate error detection. Misalignment may occur, for example, due to systematic hardware deficiencies or variations in paper position on exit from the print assembly 103. Next, one or both of the registered images may be filtered, for example smoothed and/or sharpened, in step 304 so that the target and reference images 208, 210 can be compared. The filtering process of step 304 may include sharpening of the target image and softening of the reference image edges to increase the likelihood of obtaining accurate defect detection. Following this step, defect detection may be performed in step 305, to produce a defect map which is sent to a decision function. The decision function may analyse the defect map and may decide if one or more defects are present in the image in step 306, and if so, may determine an appropriate course of action which may include halting or adjusting the printing process and/or alerting an operator. Optionally, a diagnostics function may analyse the defect map in order to determine the cause and possibly fix the cause of the error in step 307. Alternatively or additionally, the diagnostics function of step 307 may be used to keep a log of defects for maintenance scheduling and determining whether an equipment problem is imminent.

Registration of the reference image 210 and target image 208 in step 303 can be achieved using any suitable registration method as is known in the art, and it will be appreciated by the skilled person that the scope of the present invention is not restricted to a specific registration method.

Following registration and/or filtering 303, 304, defect detection may be applied to the registered reference and target images, for example corresponding to steps 305 and/or 306. In an embodiment, the defect detection function may implement a structural dissimilarity information measure (DSIM) on a pixel-by-pixel basis. The DSIM may be based on the precept that every region in the target image should have a similar region nearby in the reference image, unless it contains a defect. The DSIM may be based on the structural similarity information measure (SSIM) [6] which is based on the premise that human visual perception is highly adapted for extracting structural information from an image. The most prevalent similarity measures, such as difference or sum squared error, are easy to understand and use, but they do not correspond well to perceived visual quality [7, 8]. The defect detection function uses ideas from SSIM, which assigns a similarity value, S, to two images according to:

$$S(\vec{x}, \vec{y}) = f(l(\vec{x}, \vec{y}), c(\vec{x}, \vec{y}), s(\vec{x}, \vec{y})) \quad (1)$$

where $\vec{x}$ and $\vec{y}$ are image signals corresponding to a target region in the target image and a reference region in the reference image respectively. The SSIM may have three components: a luminance measure l, which compares the mean values of the two regions; a contrast measure, c, which compares the standard deviation of the two regions, and a structural measure, s, which compares the correlation of the two regions. These three measure are based on properties of the image pair, including the signal mean, $\mu_x$:

$$\mu_x = \frac{1}{N} \sum_{i=1}^{N} x_i, \quad (2)$$

the signal standard deviation, $\sigma_x$:

$$\sigma_x = \left( \frac{1}{N-1} \sum_{i=1}^{N} (x_i - \mu_x)^2 \right)^{\frac{1}{2}}, \quad (3)$$

and a signal cross correlation, $\sigma_{xy}$:

$$\sigma_{xy} = \left( \frac{1}{N-1} \sum_{i=1}^{N} (x_i - \mu_x)(y_i - \mu_y) \right)^{\frac{1}{2}}. \quad (4)$$

where summations are over all pixels in the relevant regions and N is the total number of pixels in a region. Based on these properties, the luminance measure, l, is defined as:

$$l(\vec{x}, \vec{y}) = \frac{2\mu_x \mu_y + C_1}{\mu_x^2 + \mu_y^2 + C_1}, \quad (5)$$

where $C_1$ is a constant. The contrast measure, c, is defined as:

$$c(\vec{x}, \vec{y}) = \frac{2\sigma_x \sigma_y + C_2}{\sigma_x^2 + \sigma_y^2 + C_2}, \quad (6)$$

where $C_2$ is a constant. Finally, the structure measure, s, is defined as:

$$s(\vec{x}, \vec{y}) = \frac{2\sigma_{xy} + C_3}{\sigma_x \sigma_y + C_3} \quad (7)$$

where $C_3$ is a constant. The constant $C_1$, may take a standard value [6] according to:

$$C_1 = (K_1 L)^2, \quad (8)$$

where L is the dynamic range of the pixel values (255 for 8-bit gray scale images), and $K_1 \ll 1$ is a small constant. Constant $C_2$ may take a value according to:

$$C_2 = (K_2 L)^2, \quad (9)$$

where $K_2 \ll 1$ is also a small constant. Finally, $C_3$ may take the value:

$$C_3 = C_2/2, \quad (10)$$

It will be appreciated by those skilled in the art that the various constants may be varied as appropriate for a particular application or image type.

For the purposes of detecting printed image defects, the DSIM has been developed which is based on a contrast measure and a structure measure, and is substantially independent of a luminance measure. In one embodiment, the DSIM takes the form:

$$D = |(1 - c(\vec{x}, \vec{y})) \times s(\vec{x}, \vec{y})| \quad (11)$$

where the contrast measure, c, and the structure measure, s, are calculated as described above.

The constants $C_2$ & $C_3$ used for the DSIM may be adjusted to suit a particular application of the defect detection method. However, it has been found that under most circumstances the same constant values as those defined for SSIM may provide acceptable results.

Figure 6:
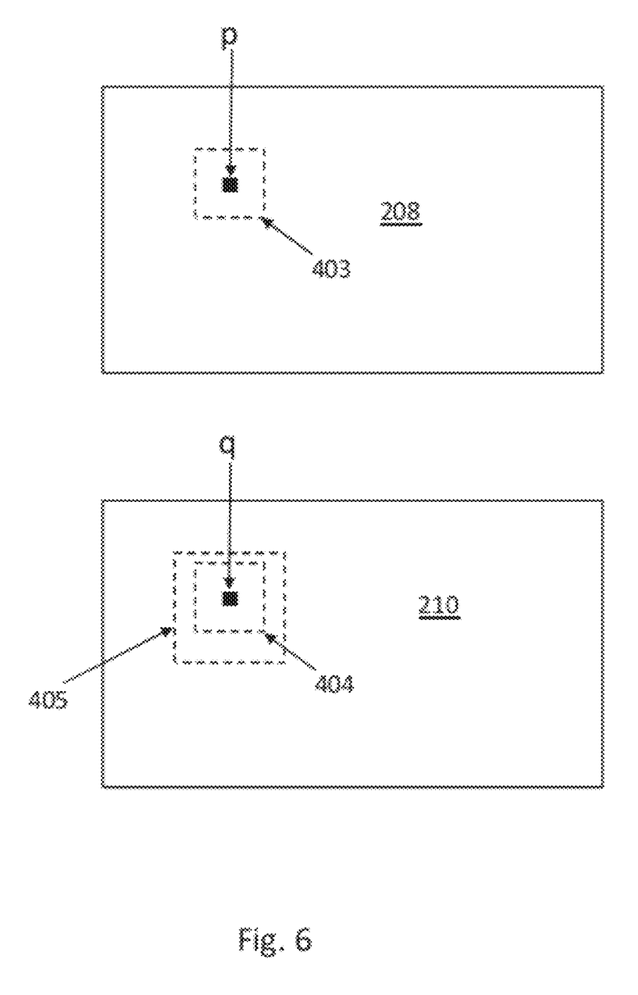
FIG. 6 further illustrates a comparison operation in an inspection method.

Turning now to FIG. 6, an embodiment of a defect detection process is illustrated for a target image 208 and a reference image 210 that may have matching formats. As will be explained, a part of the target image 208 may be compared to a corresponding part of the reference image 210. FIG. 6 shows a pixel p in the target image 208 which is located centrally in a k by k target region 403. Similarly, the reference image 210 may contain a pixel q contained in a k by k reference region 404. In some embodiments, reference pixel q may simply correspond to pixel at the identical location to pixel p. However, due to the inherent variability introduced by the scanning process it is generally more accurate to perform an additional local registration for each pixel. In the illustrated embodiment, a window 405 of size w by w is defined. Next, the window 405 may be searched to find the 'best match' reference region. Once the reference region is determined, the central pixel is taken to be pixel q and the DSIM can be calculated.

Multiple target regions may be compared to multiple corresponding reference regions in parallel. Advantageously, multiple CPU's may be used to perform multiple comparison operations in parallel.

The 'best match' reference region may for example be determined using the SSIM measure. The SSIM for each k by k region in window 404 may be calculated and the region with the highest SSIM is selected as the target region. However, if the relatively high SSIM grade is found for a certain region, this region may be selected as the target region. In an embodiment, optimization may be applied for preventing having to calculate the SSIM for each region and/or searching the whole w x w window. In an ideal system where the images are registered exactly no defects exist and pixel q will be in the location corresponding to that of pixel p in the target image. Conversely, where a defect exists at pixel p, the best matching reference region will be a poor match and the associated DSIM will likely indicate the presence of a defect at this position.

Following determination of the 'best match' reference region and consequently the location of reference pixel q, the defect detection process calculates the DSIM, D, associated with the target pixel, p, and reference pixel, q, according to equation (8) above. The process of determining the 'best match' region, in this instance without above mentioned optimization, and then calculating the DSIM can be summarised as follows:

For each pixel 'p' in target image:
k by k frame: x=x(p), centred at p
1. Find best matching k×k pixel frame y=y(p) in reference image within window of size w by w using S.
2. Compute D on basis of best matching frame.

A further part of the system may involve notifying the operator that a defect has occurred and optionally the seriousness of it (for example, press-stopping or not). This functionality may be performed by the decision function 306 which takes results generated by the detection function (e.g. the defect map and/or defect image). In the case of the binary defect map, analysis techniques such as morphological filtering or median filtering can be applied efficiently to reduce the noise and remove visually imperceptible defects. In one embodiment of the invention, projections in both the horizontal and vertical directions on the pre or post filtered defect map are performed to determine if human visible defects occur on the page. For example, if a predetermined number of consecutive pixels, e.g. two or more, in a row or column of the defect map are defective, this may be flagged as a visible defect. Size and shape of the defect may be used to determine whether the defect warrants an automatic shut-down of the machine or triggers a warning to the operator without affecting the current print job. In the event of a defect, the defect map can also help with diagnosis and repair. In some embodiments, the defect map (with or without the target image data and/or defect image), can be passed to a diagnosis system for further analysis and recovery procedures.

For a particular target pixel, the local registration, DSIM and SSIM operations may depend only on a small number of nearby pixels, and the computation is order independent. Moreover the algorithm may be compute-intensive and not memory bounded. These characteristics may make DSIM a candidate for acceleration on a GPU.

The defect detection method described hereinbefore can be implemented using the CUDA® computing interface from Nvidia®. The CUDA® interface gives the programmer low level access to the computational capacity of the GPU. The implementation achieves parallelism that is dictated by the number of processing units in the GPU. To reduce memory access each image is stored in texture data storage which is cached and optimized for a two-dimensional memory access pattern. Additionally, DSIM for each pixel is computed for each color channel independently. This significantly improves the memory access time since each pixel is only accessed once. After the DSIM for each color channel is computed their values are combined with a logical OR operator to yield the final DSIM decision.

Whilst the above described embodiments relate to detection of defects in images printed on print medium, it will be understood that further embodiments of the invention may equally be applied to images printed onto products including, but not limited to web paper, fabric, polymer substrate or silicon substrate. Indeed, in some embodiments of the invention, the image may be printed using a functional marking material to produce, for example, an electrical circuit or component. In such applications, a detection of defects may be desirable if circuit malfunctions are to be avoided. Therefore, it will be understood by a person of normal skill in the art that the term 'image' as used herein is not limited to an image printed on conventional print media or using conventional marking material, but may extend to any optically, electrically or physically formed reproduction.

For purposes of simplicity of explanation, the illustrated methodologies have been shown and described as a series of functional blocks. It will be appreciated by those of ordinary skill in the art that the methodologies are not limited by the order of the blocks, as some blocks can occur in different orders and/or concurrently with other blocks from that shown and described. Moreover, fewer than all the illustrated blocks may be required to implement an example methodology. It will be further appreciated that electronic and software applications may involve dynamic and flexible processes so that the illustrated blocks can be performed in other sequences that are different from those shown and/or that blocks may be combined or separated into multiple components. The methods and processes described hereinbefore may be implemented using various programming approaches like machine language, procedural, object oriented and/or artificial intelligence techniques.

The above embodiments are to be understood as illustrative examples of the invention. Further embodiments of the invention are envisaged. For example, selection of the 'best match' reference region could be performed using the average region luminance (rather than SSIM) or other suitable measure as is known in the art. Alternatively or additionally, in some embodiments, the defect detection method could be applied to each color separation separately.

In one aspect, an automated inspection method for detecting a defect in a printed image 206 may be provided, comprising (i) processing a raster image 203, (ii) sending the raster image 203 to a print process 205, (iii) printing a printed image 206 corresponding to the raster image 203 onto a medium 111, (iv) capturing a target image 208 from at least a part of the printed image 206 at a lower resolution than the printed image 206, at least in a medium moving direction M, (v) converting at least a part of the raster image 203 to a reference image 210, and (vi) comparing the reference image 210 to the target image 208. The print process may comprise halftoning the raster image 203 before printing, and printing the halftoned image 206. The resolution of the target image 208 may comprise less than approximately 300 dots per inch in a moving direction of the medium M. The target image 208 may have a Red Green Blue (RGB) color spectrum. In a first stage the reference image 210 may have a Cyan, Magenta, Yellow and Black (CMYK) color spectrum.

The resolution and/or the color spectrum of the reference image 210 may be converted to be approximately equal to the resolution and/or the color spectrum, respectively, of the target image 208. The target image 208 may comprise a grayscale image. The raster image 203 may comprise multiple color channels, and the method may further comprise converting at least a part of the multiple color channel raster image 203 into a one color channel reference image 210, for example in one or multiple steps.

The method may further comprise applying and combining structural similarity measurement (SSIM) methods [6] for each Red, Green and Blue channel, using weights according to their effect on luminance. SSIM is described in some of the references mentioned in this description.

The method may be useful for variable data printing, for example when printing at least one page per second and wherein each page is printed using a different raster image. The print system 100 and inspection method may allow for fast comparisons of target and reference images 208, 210. The print system 100 and inspection method may allow for real time defect detection using variable data printing, i.e. different raster images, for high number printing (e.g. more than 10,000 pages, or more than 30,000 pages) at speeds of at least one page per second. Using RGB and/or one color channel (monochrome) sensors and target images 208 may allow for high speed variable data printing at relatively low cost and without taking up a lot of space in the print system 100.

The inspection method may further comprise comparing multiple reference image regions 404 with multiple corresponding target image regions 403 in parallel through multiple processing units for one printed image.

In a second aspect, a print system 100 may be provided, the print system 100 may comprise (i) a print assembly 103, (ii) an image processor 102 arranged to process a raster image 103 for the print assembly 103 and to convert the raster image 103 to a reference image 110, (iii) an in-line image capture assembly 109 that is arranged to capture an image of printed medium 111 so as to provide a target image 208 at a lower resolution than the printed image 206, and (iv) a processing unit 110 arranged to compare a target image 208 with a reference image 210. The in-line image capture assembly 109 may comprise at least one image capture sensor arranged to capture an image of the printed medium 111 at a lower resolution than the print resolution. The at least one image capture sensor may be arranged to capture at least one of an RGB and monochrome target image 208. The processing unit 110 may comprise multiple graphical processing units each arranged to compare a part of a target image 208 with a corresponding part of a reference image 210 (in this description also referred to as target regions 403 and reference regions 210), and the multiple graphical processing unit are arranged to perform said comparison operation in parallel.

In a third aspect, a computer readable medium may be provided, which may comprise instructions for instructing a print system 100 to perform an automated inspection method for detecting a defect in a printed image 206, said method comprising (i) processing a raster image 203, (ii) sending the raster image 203 to a print process, (iii) printing a printed 206 image corresponding to the raster image 203 onto a medium 111, (iv) capturing a target image 208 from at least a part of the printed image 206 at a lower resolution than the printed image 206, (v) converting at least a part of the raster image 203 to a reference image 210, and comparing the reference image 210 to the target image 208.

In the above, processing a raster image 203 may comprise generating a raster image 203 from an input image. Processing a raster image may 203 also comprise directly receiving a raster image 203. Accordingly, an image processor 102 may be provided that is arranged to process a raster image 203 for the print assembly 103. The image processor 102 may be arranged to convert an input image 201 into said raster image 203 suitable for the print assembly 103, and/or the image processor 102 may be arranged to receive a raster image and direct it to the print assembly.

The low resolution of the target image 208 and the RGB or grey scale color scale of the target image 208 may allow for a relatively fast image capture. Relatively low resolution RGB or grey scale image sensors may be relatively cost efficient. Using multiple graphical processing units configured to execute above image comparison operations in parallel may be relatively cost and time efficient, at least as compared to conventional central processing units.

In some embodiments, the print system 100 and defect detection method may be required to operate with a variable data printing system. In such systems every page may be potentially different and, as a result, defect detection may need to operate in real-time. This requirement translates to a processing rate of at least one page per second for current industrial printing systems. Graphics Processing Units (GPU) may be used to perform parallel computations. Tests have shown that by using the digital raster image for creating a reference image, for example in CMYK, and using multiple low resolution RGB and/or monochrome image sensors, and GPUs an accurate defect inspection method for high number variable print operations may be provided at relatively low cost, low complexity and high space efficiency. This may be advantageous in LEP print systems or the like.

In the description, several terms are used for certain features and functions. However, it will be apparent to the skilled person that the nomenclature of these features and functions may also be chosen differently without departing from the spirit of the invention.

The above description is not intended to be exhaustive or to limit the invention to the embodiments disclosed. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, while a reference to a certain number of elements does not exclude the possibility of having more elements. A single unit may fulfil the functions of several items recited in the disclosure, and vice versa several items may fulfil the function of one unit.

The mere fact that certain measures are recited in mutually different dependent claims does not indicate that a combination of these measures cannot be used to advantage. Multiple alternatives, equivalents, variations and combinations may be made without departing from the scope of the invention.

REFERENCES

[1] Bill Smith, "Making war on defects", *IEEE Spectrum*, vol. 30, no. 9, pp. 43-47, 1993.

[2] Shang-Hong Lai and Ming Fang, "An accurate and fast pattern localization algorithm for automated visual inspection", *Real-Time Imaging*, vol. 5, pp. 3-14, 1999.

[3] Madhav Moganti and Fikret Ercal, "Automatic PCB inspection algorithms: A survey", *Computer Vision and Image Understanding*, vol. 63, no. 2, pp. 287-313, 1996.

[4] Roland T. Chin, "Automated visual inspection algorithms", in *Computer Vision: Theory and Industrial Applications*, Ed. Carme Torras, 1992, pp. 377-404.

[5] Byron E. Dom and Virginia Brecher, "Recent advances in the automatic inspection of integrated circuits for pattern defects", *Machine Vision and Applications*, vol. 8, pp. 5-19, 1995.

[6] Zhou Wang, Alan C. Bovik, Hamid-R. Sheikh, and Eero P. Simoncelli, "Image quality assessment: from error measurement to structural similarity", *IEEE Transactions on Image Processing*, vol. 13, 2004.

[7] Alan C. Bovik, Zhou Wang, and Ligang Lu, "Why is image quality assessment so difficult?", *Proceedings of the IEEE International Conference on Acoust., Speech, and Signal Processing*, 2004, vol. 4, pp. 3313-3316.

[8] Ahmet M. Eskicioglu and Paul S. Fisher, "Image quality measures and their performance", *IEEE Transactions on Communications*, vol. 43, no. 12, pp. 2959-2965, 1995.

What is claimed is:

1. An automated inspection method for detecting a defect in a printed image, comprising:
    processing a raster image;
    sending the raster image to a print process;
    printing a printed image corresponding to the raster image onto a medium;
    capturing a target image from at least a part of the printed image at a lower resolution than the printed image, at least in a medium moving direction;
    converting at least a part of the raster image to a reference image;
    identifying a reference region in a window area of the reference image that is a best match to a target region in the target image using a first similarity measurement technique;
    comparing a reference pixel in the identified reference region of the reference image to a target pixel in the target region of the target image using a second similarity measurement technique different from the first similarity measurement technique; and
    indicating a defect based on the comparison.

2. An automated inspection method according to claim 1, wherein the print process comprises halftoning the raster image before printing, and printing the halftoned image.

3. An automated inspection method according to claim 1, wherein the lower resolution comprises less than approximately 300 dots per inch in a moving direction of the medium.

4. An automated inspection method according to claim 1 wherein, in a first stage, the reference image has a Cyan, Magenta, Yellow and Black (CMYK) color spectrum.

5. An automated inspection method according to claim 1, wherein identifying the reference region that is the best match comprises determining a first structural similarity measurement (SSIM) between the reference region and the target region and comparing the first SSIM to a second SSIM for a second reference region.

6. An automated inspection method according to claim 1, wherein a resolution and/or a color spectrum of the reference image are converted to be approximately equal to a resolution and/or a color spectrum, respectively, of the target image.

7. An automated inspection method according to claim 1, wherein the target image comprises a grayscale image.

8. An automated inspection method according to claim 1, wherein the raster image comprises multiple color channels, and the method further comprises converting at least a part of the raster image into a one color channel reference image.

9. An automated inspection method according to claim 1 wherein, for variable data printing, the method further comprises printing at least one page per second, wherein each page is printed using a different raster image.

10. An automated inspection method according to claim 1, wherein identifying the reference region that is the best match to the target region in the target image comprises comparing multiple reference image parts with multiple corresponding target image parts in parallel through multiple processing units for one printed image.

11. A print system, comprising:
    an image processor to convert an input image to a raster image and to convert the raster image to a reference image;
    an in-line image capture assembly to capture an image of printed medium to provide a target image at a lower resolution than a printed image; and
    a processing unit to compare a target image with a reference image by:
    identifying a reference region in a window area of the reference image that is a best match to a target region in the target image using a first similarity measurement technique; and
    comparing a reference pixel in the identified reference region of the reference image to a target pixel in the target region of the target image, the processing unit to identify whether a defect is present based on the comparison using a second similarity measurement technique different from the first similarity measurement technique.

12. A print system according to claim 11, wherein the in-line image capture assembly comprises an image capture sensor to capture the target image at a lower resolution than a print resolution.

13. A print system according to claim 11, wherein the image capture sensor is to capture the target image as at least one of an RGB target image or a monochrome target image.

14. A print system according to claim 11, wherein the processing unit comprises multiple graphical processing units to compare, in parallel, the target region with different respective reference regions in the window area.

15. A computer readable storage device comprising instructions for instructing a print system to at least:
    process a raster image;
    send the raster image to a print process;
    print a printed image corresponding to the raster image onto a medium;
    capture a target image from at least a part of the printed image at a lower resolution than the printed image;
    convert at least a part of the raster image to a reference image;
    identify a reference region in a window area of the reference image that is a best match to a target region in the target image using a first similarity measurement technique;
    compare a reference pixel in the identified reference region of the reference image to a target pixel in the target region of the target image using a second similarity measurement technique different from the first similarity measurement technique; and indicate a defect in the target image based on the comparison.

16. A method according to claim 5, wherein comparing the reference pixel to the target pixel comprises determining a dissimilarity information measurement (DSIM) between the reference pixel and the target pixel.

17. An automated inspection method for detecting a defect in a printed image, comprising:

processing a raster image;

sending the raster image to a print process;

printing a printed image corresponding to the raster image onto a medium;

capturing a target image from at least a part of the printed image at a lower resolution than the printed image, at least in a medium moving direction;

converting at least a part of the raster image to a reference image;

identifying a reference region in a window area of the reference image that is a best match to a target region in the target image by determining a first structural similarity measurement (SSIM) between the reference region and the target region and comparing the first SSIM to a second SSIM for a second reference region;

comparing a reference pixel in the identified reference region of the reference image to a target pixel in the target region of the target image by determining a dissimilarity information measurement (DSIM) between the reference pixel and the target pixel, wherein the DSIM is based on a contrast measure of the reference pixel and the target pixel and based on a structure measure of the reference pixel, the DSIM measure being independent of a luminance measure of the reference pixel and the target pixel; and indicating a defect based on the comparison.

18. A storage device as set forth in claim 15, wherein identifying the reference region comprises using a structural similarity measurement (SSIM) technique and comparing the reference pixel to the target pixel comprises using a structural dissimilarity measurement (DSIM) technique.

19. A computer readable storage device comprising instructions for instructing a print system to at least:

process a raster image;

send the raster image to a print process;

print a printed image corresponding to the raster image onto a medium;

capture a target image from at least a part of the printed image at a lower resolution than the printed image;

convert at least a part of the raster image to a reference image;

identify a reference region in a window area of the reference image that is a best match to a target region in the target image;

compare a reference pixel in the identified reference region of the reference image to a target pixel in the target region of the target image, wherein comparing the reference pixel to the target pixel comprises using a structural dissimilarity measurement (DSIM), the DSIM being based on a contrast measure of the reference pixel and the target pixel and based on a structure measure of the reference pixel, the DSIM being independent of a luminance measure of the reference pixel and the target pixel; and indicate a defect in the target image based on the comparison.

* * * * *